United States Patent [19]

Horwitz et al.

[11] Patent Number: 5,078,894
[45] Date of Patent: Jan. 7, 1992

[54] FORMULATIONS FOR IRON OXIDES DISSOLUTION

[75] Inventors: Earl P. Horwitz; Renato Chiarizia, both of Argonne, Ill.

[73] Assignee: Arch Development Corporation, Chicago, Ill.

[21] Appl. No.: 516,436

[22] Filed: Apr. 30, 1990

[51] Int. Cl.⁵ .................. C23F 11/00; C23F 11/10; C02F 5/10; C01B 3/00
[52] U.S. Cl. ............................ 252/81; 252/82; 252/84; 252/85; 252/86; 252/87; 252/180; 252/181; 252/188.1; 252/188.2; 252/188.22; 252/188.25
[58] Field of Search ............ 252/80, 82, 84, 85, 252/86, 87, 81, 105, 180, 181, 188.1, 188.2, 188.21, 188.22, 188.23, 188.25, 174.16

[56] References Cited

U.S. PATENT DOCUMENTS

| | | | |
|---|---|---|---|
| 3,935,125 | 1/1976 | Jacob | 252/181 |
| 4,432,865 | 2/1984 | Norman | 208/183 |
| 4,554,090 | 11/1985 | Jones | 252/181 |
| 4,747,975 | 5/1988 | Ritter | 252/80 |
| 4,810,405 | 5/1989 | Waller et al. | 252/81 |
| 4,937,002 | 6/1990 | Bainbridge et al. | 252/180 |

*Primary Examiner*—Paul Lieberman
*Assistant Examiner*—William S. Parks
*Attorney, Agent, or Firm*—Frishauf, Holtz, Goodman & Woodward

[57] ABSTRACT

A mixture of a di- or polyphosphonic acid and a reductant wherein each is present in a sufficient amount to provide a synergistic effect with respect to the dissolution of metal oxides and optionally containing corrosion inhibitors and pH adjusting agents.

11 Claims, No Drawings

FORMULATIONS FOR IRON OXIDES DISSOLUTION

This invention was developed under contract from the DOE W-31-109-ENG-38.

CROSS-REFERENCE TO RELATED APPLICATIONS

This application is related to PCT International Patent Application No. PCT/US89/04857 which deals with complexing agents for solubilizing certain heavy metals.

BACKGROUND OF THE INVENTION

The present invention relates to a synergistic composition for dissolving metal oxides and in particular iron oxides.

The dissolution of iron oxides is a very important technological process with applications in a number of different fields. Effective dissolution agents can be useful for (1) leaching of oxide ores in hydrometallurgy to recover metal values from the oxide ores; (2) removal of iron oxide contaminants from non-metallic materials such as minerals (e.g. kaolin and silica), of importance for the glass and ceramic manufacturing industry; (3) stripping of metal ions from extraction solvents or from ion exchange resins; (4) cleaning of metals prior to subsequent processing (e.g. removal of scale from a metal prior to rolling, anodizing, galvanizing or painting; (5) removal of deposits from equipment in contact with hot water or steam (e.g. thermal power equipment, heat exchangers and piping, and boilers); (6) cleaning or treatment of rusty bolts, nuts and connectors; (7) removal of stains (iron oxide related) from fabrics; and (8) treatment of radioactive materials including removal of a surface layer of oxides from steel equipment used for radioactive material processing or in nuclear plants, in order to facilitate the removal of radioactive contaminants (e.g. the actinide and lanthanide elements) present in or below the surface oxide layers by subsequent application of an appropriate complexing agent; leaching of radioactive sludge; and leaching of radioactive soil.

It is known in the art that acids accelerate the dissolution of metal oxides; however severe conditions of concentration or temperature are usually required to achieve fast rates. These conditions present safety hazards in handling and the potential for corrosion, if metals are present.

It is also known in the art that reductants can accelerate the dissolution of metal oxides, but the dissolution rates under moderate conditions are still low.

In general this can be seen in the following:

GB-1229582 ((Albright & Wilson Mfg. Ltd.-1971)- U.S. Pat. No. 3,634,257 (1972) equivalent) describes the use of phosphonic acids to remove encrustations containing calcium carbonate or iron compounds from rigid surfaces, e.g. stills and boiler tubes. The preferred acid is 1-hydroxyethylidene-1,1-diphosphonic acid, which can also be used with other scale removing acids and with ammonia.

Albright & Wilson sells a product based on GB 1229582, BRIQUEST DP 13, for use as a railway carriage cleaner. It is described as a blend of BRIQUEST ADPA (1-hydroxyethylidene-1,1-diphosphonic acid) and orthophosphoric acid specifically formulated for use with carriage-washing machines.

Valverde N. and Wagner, C., Ber. Bunsenges Physik. Chem. 80(4) (1976) 330 and Valverde N., Ber. Bunsenges. Physik. Chem. 80(4) (1976) 333 describe experiments which show that the dissolution of iron oxide is accelerated by decreasing the redox potential and attribute this to reduction of $Fe^{+3}$ in the oxide lattice to give the more soluble $Fe^{+2}$.

Lu, Z. Y. and Muir, D. M., Hydrometallurgy 21 (1988) 9 describes experiments in which an enhanced leaching rate of metal ferrites and iron oxides is found when HCl leaching solutions also contain $Cu^{+1}$ or $Sn^{+2}$ as reductants.

Zinder, B., Furrer, G. and Stomm, W., Geochimica et Cosmochimica Acta 50 (1986) 1861 describes acceleration of the rate of alpha—FeOOH dissolution by $NaNO_3$ in the presence of ascorbic acid.

Surana, V. S. and Warren, H. J., Trans. Inst. Min. Metal. Sec. C, 28 (1969) C133–C139 and Kunda, W., Rudyk, B. and Mackiw, V. N., Bull. Can. Inst. Min. Metall. 61 (1968) 819 describe the use of $SO_2$ in dissolution of iron oxides.

Warren, I. H., "Removal of Iron Oxide from Silicate Minerals" in M. E. Wadsworth and F. T. Davis (Eds.), Unit Processes in Hydrometallurgy, Vol. 1, pages 300–307, A.I.M.E., NY, 1964 describes the use of sodium dithionite in dissolution of iron oxides.

Gorichev, I. G. and Kipriyanov, N. A., "Regular Kinetic Features of the dissolution of Metal Oxides in Acidic Media", Russian Chemical Reviews 53(11) (1984) 1039 is a review article which discusses the effect of redox couples on the rate of dissolution of metal oxides.

Azuma, K. and Kametani, H., Trans. Metall., Soc. AIME 230 (1964) 853 indicates that the rate of dissolution of iron oxides increases with the stability constant of $Fe^{+3}$ with the anion of the electrolyte.

Banwart, S., Davies, S. and Strumm, W., Colloids and Surfaces 39 (1989) 303, describes the use of oxalic acid and L-ascorbic acid to dissolve iron oxide and shows an advantage for using the two together.

Gorichev, I. V., Gorsheneva, V. F., Kipriyanov, N. A. and Klyuchnikov, N. G., Kinetika i Kataliz 21 (6) (1980) 1422, describes the dissolution of magnetite ($Fe_3O_4$) with 1-hydroxyethylidene-1,1-diphosphonic acid and refers to the potential use in removal of magnetite deposits and scale from steel.

U.S. Pat. No. 3,854,996 to Frost teaches the use of polyphosphonic acids to remove magnetite (iron oxide) scale. To help with the action, the use of an oxidizing agent is recommended.

BRIEF DESCRIPTION OF THE INVENTION

Metal oxides and metal salts are dissolved by treatment with aqueous solutions containing mixtures of di- or polyphosphonic acids and reducing agents, preferably sulfur based. Optionally, the solution can contain corrosion inhibitors and pH adjusting agents.

The mixtures according to the present invention produce dissolution rates which are substantially higher than those observed with either the acids or the reductants by themselves.

Of the di- and polyphosphonic acids, 1-hydroxyethylidene-1,1-diphosphonic acid (HEDPA) is especially preferred for its high activity.

Preferred reductants are the sulfur-based reducing agents such as sodium sulfite ($Na_2SO_3$) and especially sodium formaldehyde sulfoxylate (SFS) and sodium dithionite ($Na_2S_2O_4$).

When used on some metal surfaces, it is expected that corrosion can be a problem. Corrosion inhibitors or pH adjustors (to neutralize the normally acid mixture or render it basic) can reduce corrosion problems.

The inventive mixtures can be used especially to remove radioactive contaminants from equipment and tools used in handling and processing radioactive materials and in dissolving radioactive sludge and removing radioactive oxides and salts from contaminated soil where alternative methods are not readily available.

DETAILED DESCRIPTION

The invention is based on the discovery that aqueous mixtures of di- or polyphosphonic acids and reducing agents produce unexpectedly high dissolution rates as compared with the rates obtained for acids or for reducing agents alone, or mixtures thereof in general.

Reducing agents include sulfur-based reducing agents such as sulfurous acid, disulfurous acid, dithionous acid, hydroxymethylsulfinic acid (acid of SFS), hydroxymethyl sulfonic acid, and their salts; phosphorous based reductants such as phosphorous acid, hypophosphorous acid and their salts; aldehyde or hydroxymethyl adducts thereof, such as formaldehyde, acetaldehyde, hydroxymethylsulfinic acid, hydroxymethyl sulfonic acid, or their salts, tetrakis(N,N,N',N'-hydroxymethyl)urea, and a tetrakis(hydroxymethylphosphonium) salt. Nascent hydrogen (produced in situ) and water soluble salts forming $Cr^{+2}$, $V^{+2}$ and $Cu^{+1}$ are further examples of reductants for use in the present invention.

The synergistic effect is very pronounced in the case of di- or polyphosphonic acids mixed with sulfur-based reducing agents, and especially a combination of HEDPA and SFS. Very high rates were also observed for hydrogen produced in situ (by reaction of Zn in an acid media). Both HEDPA and SFS by themselves produce very low dissolution rates, but when combined, very fast dissolution rates are obtained even at 25 degrees Centigrade. This permits safer, faster and easier processing while minimizing the risk of corrosion. Corrosion can be further inhibited using pH adjustors or usual corrosion inhibitors.

For an acidic mixture as described above, a pH adjustor will normally be a basic substance. Thus, when pH adjustors are used, the acids will be at least partially converted to their salts. pH adjustors are, for example, alkali metal or alkaline earth metal hydroxides such as sodium, calcium or potassium hydroxide. As the mixture is neutralized, most or all of the phosphonic acid will convert into the corresponding alkali metal or alkaline earth metal salt. This conversion will be substantially complete when the inventive mixture is adjusted into the alkaline pH range.

Other pH adjusting agents that can be used to advantage include ammonium and various derivatives thereof e.g. alkyl, alkylene or alkanol derivatives. Examples of alkyl derivatives include a $C_1-C_3$ alkyl amine and especially methyl amine, di- or tri-methyl amine. Alkylene derivatives include ethylene diamine and others corresponding to the alkyl compounds. Corresponding alkanol derivatives can also be used, including diethanol amine for example.

One important use for this technology is in decontaminating tools, reactors and other equipment, which have been contaminated with radioactive materials (e.g. oxides and salts of actinide and lanthanide elements) in nuclear weapons and nuclear power operations. Although the invention can be applied quite widely for removal or dissolution of metal oxides as noted above; for decontamination of radioactive metal surfaces there are few practical alternatives available. Control of corrosiveness as by pH adjusting agents or corrosion inhibitors may be particularly important in these uses, to avoid degrading difficult to replace parts and apparatus.

In order to decontaminate a metal surface according to the invention, the surface oxide coating containing the radioactive contaminants is removed. The best way to do this is to attack and dissolve the surface oxide coating directly. The surface oxide will in most cases be an iron oxide since most equipment is constructed from iron or iron-containing alloys. The radioactive contaminants may then be carried or washed into solution with the iron oxide, or complexed with reactants to take them into solutions.

A further advantageous use for this technology is for the retrieval and treatment of high level nuclear waste, at present stored in single or double shell tanks at a number of nuclear sites. Many of these nuclear waste solutions have been neutralized in the tanks by addition of alkali, to reduce their corrosive power. This treatment has generated large amounts of radioactive sludge in the tanks. In order to retrieve and further process these wastes to concentrate the high level radioactive components and carry out permanent disposal, it will be necessary to leach and/or dissolve the sludge solids to release the radioactive metals into solution.

A third use is in the leaching of radioactive or other metal (e.g. chromium) contaminants from contaminated soils. Leaching of soils is accomplished by heap leaching or by processing in tanks.

Other uses include treating of oxide ores (as by heap leaching or in tanks) in hydrometallurgy to leach metal values from the oxide ores; removal of iron oxide contaminants from non-metallic materials such as minerals (e.g. kaolin and silica by batch processing in tanks); washing metals with the inventive composition prior to processing (e.g. removal of scale from a metal prior to rolling, anodizing, galvanizing or painting); (7) flushing of pipes, boilers, and etc. for the removal of deposits from surfaces in contact with hot water or steam by pumping the mixture through the pipes; cleaning or treatment of rusty bolts, nuts and connectors; and (9) removal of stains (iron oxide related) from fabrics by solubilizing the iron oxide and washing it away.

To illustrate the very effective oxide dissolving effectiveness of the acid/reductant mixtures of the invention, a synthetic iron oxide mineral, Goethite (alpha-FeOOH), is used as a model.

EXPERIMENTAL PROCEDURE

Radioactive synthetic Goethite samples, containing $^{59}Fe$ at a level of $1.7 \times 10^4$ count per minute/mg of dried solid were prepared and used for this and subsequent dissolution experiments.

The dissolution experiments were performed by contacting in screw-cap glass tubes a weighed amount of radioactive Goethite (about 50 mg) with the dissolving medium at a volume-weight ratio of 40 (2 ml for 50 mg). The size of the particles of iron oxide were estimated to be in the range of 60-120 mesh. The glass tubes containing the Goethite were thermally equilibrated in a heating bath and then the dissolving solution was added.

The mixture in the glass tubes was agitated using a magnetic stirrer, to suspend the iron oxide in the dissolving medium. At various time intervals tubes were withdrawn from the bath; rapidly quenched by cooling;

and thereafter centrifuged to remove the particles of Goethite for suspension.

The iron levels in the supernatant solutions were measured by measuring the radioactivity of the supernatant solution with a gamma counter. First order rate constants and induction times for dissolution of the Goethite were calculated from the measurements by standard methods.

EXAMPLE 1

Samples of the Goethite were treated at 25 degrees Centigrade with 0.1 M solutions of each of the following reductants: hydroquinone, $NH_2OH \cdot HCl$, $SnCl_2$, $Na_2SO_3$, $Zn(H_2)$, $Na_2S_2O_4$ and sodium formaldehyde sulfoxylate (SFS), or 1.0 M samples of each of the following diphosphonic acids: 1-hydroxyethylidene-1,1-diphosphonic acid (HEDPA), vinylidene-1,1-diphosphonic acid (VDPA) and 1,2-dihydroxyethylidene-1,1-diphosphonic acid (DHEDPA).

It is noted that $Zn(H_2)$ indicates the use of hydrogen formed in situ by use of Zn in an acid medium. It is the nascent hydrogen that acts as the reductant.

No significant dissolution was observed for any of these reductants. The first order rate constants were $<1.0 \times 10^{-6}$ sec$^{-1}$. Thus, the reductants alone and the acids alone are not effective dissolution agents.

EXAMPLE 2

Goethite samples were treated at 25° C. with mixtures of 1 M HEDPA and various reductant using the procedures described in Example 1. The first order rate constants (k) and induction times (ti) for dissolution of the solid were measured. The results were as follows:

| Reductant | k(sec-1) | ti(min) |
|---|---|---|
| none | $<1.0 \times 10^{-6}$ | not determined |
| 0.1 M hydroquinone | $1.0 \times 10^{-6}$ | 0 |
| 0.1 M $NH_2OH \cdot HCl$ | $1.0 \times 10^{-6}$ | 0 |
| 0.1 M $SnCl_2$ | $2.3 \times 10^{-5}$ | 0 |
| 0.1 M $Na_2SO_3$ | $2.2 \times 10^{-4}$ | 47 |
| 0.2 M $Zn(H_2)$ | $5.0 \times 10^{-4}$ | 23 |
| 0.1 M $Na_2S_2O_4$ | $1.9 \times 10^{-3}$ | 0 |
| 0.1 M SFS | $2.3 \times 10^{-3}$ | 8 |

Although all HEDPA/reductant mixtures provided rate accelerations relative to the individual components, the accelerations with HEDPA/sodium dithionite ($Na_2S_2O_4$) and HEDPA/sodium formaldehyde sulfoxylate (SFS) mixtures were amazingly large (>2000 fold) as compared with the individual component.

EXAMPLE 3

Goethite samples were treated at 25 degrees Centigrade with 0.1 M solutions of SFS and various diphosphonic acids, using the procedures described in Example 1. The first order rate constants and induction times for dissolution of the solid were measured. The results were as follows:

| Acid | k(sec-1) | ti(min) |
|---|---|---|
| none | $<1.0 \times 10^{-6}$ | not determined |
| HEDPA | $2.3 \times 10^{-3}$ | 8 |
| VDPA | $2.5 \times 10^{-4}$ | 0 |
| DHEDPA | $3.4 \times 10^{-4}$ | 0 |

All diphosphonic acids gave large (2-3 orders of magnitude) rate accelerations, with the HEDPA/SFS rate being the largest.

EXAMPLE 4

Goethite samples were treated at 25 degrees Centigrade with various acids in the presence and absence of 0.1 M SFS, using the procedures described in Example 1. The first order rate constants and induction times for dissolution of the solid were measured. The results were as follows:

| Acid/Reductant | k(sec-1) | ti(min) |
|---|---|---|
| 2 M HCl/none | $2 \times 10^{-6}$ | 0 |
| 2 M HCl/SFS | $2.0 \times 10^{-5}$ | 0 |
| 1 M Oxalic/none | $5.0 \times 10^{-5}$ | 49 |
| 1 M Oxalic/SFS | $5.2 \times 10^{-4}$ | 0 |

Rate accelerations of only about 10 fold were observed with these acids using SFS as the reductant.

EXAMPLE 5

Goethite samples were treated at 80 degrees Centigrade with various acids in the presence and absence of 0.1 M SFS, using the procedures described in Example 1. The first order rate constants and induction times for dissolution of the solid were measured. The results were as follows:

| Acid/Reductant | k(sec-1) | ti(min) |
|---|---|---|
| 1 M $HNO_3$/none | $4.8 \times 10^{-6}$ | 0 |
| 1 M $HNO_3$/SFS | $4.1 \times 10^{-5}$ | 0 |
| 3 M $H_2SO_4$/none | $5.7 \times 10^{-4}$ | 29 |
| 3 M $H_2SO_4$/SFS | $1.9 \times 10^{-3}$ | 0 |
| 1 M HEDPA/none | $1.8 \times 10^{-4}$ | 120 |
| 1 M HEDPA/SFS | $1.1 \times 10^{-2}$ | 0 |

When combined with mineral acids, rate accelerations of less than an order of magnitude were observed: SFS gave rate accelerations of 8.5 with 1 M $HNO_3$ and 3.3 with 3 M $H_2SO_4$. The rate acceleration with 1 M HEDPA under these conditions was about two orders of magnitude at 78.

EXAMPLE 6

Goethite samples were treated under mild temperature conditions of 25 degrees Centigrade with 1 M HEDPA and 0.1 M solutions of various reducing agents, using the procedures described in Example 1. The times for dissolution of the Goethite were measured and the times in minutes for dissolution of 10%, 50% and 90% of the solids were calculated. The results were as follows:

| Reductant | 10% (min) | 50% (min) | 90% (min) |
|---|---|---|---|
| $NH_2OH$ | >100 | >100 | >100 |
| $NH_2NH_2$ | >100 | >100 | >100 |
| Hydroquinone | >100 | >100 | >100 |
| ascorbic acid | >100 | >100 | >100 |
| $Sn^{+2}$ | >100 | >100 | >100 |
| $Na_2SO_3$ | 42 | >100 | >100 |
| $Zn (H_2)$ | 19 | 46 | >100 |
| SFS | 5 | 13 | 27 |
| $Na_2S_2O_4$ | 1 | 6 | 27 |

The particularly high activity available with sulfur based reductants and in situ formed hydrogen (nascent) can be seen from these results.

EXAMPLE 7

Goethite samples were treated at 80 degrees Centigrade with 0.1 M HEDPA and 0.1 M solutions of various reducing agents, using the procedures described in Example 1. The times for dissolution of the Goethite were measured and the times in minutes for dissolution of 10%, 50% and 90% of the solids were calculated. The results were as follows:

| Reductant | 10% (min) | 50% (min) | 90% (min) |
|---|---|---|---|
| $NH_2OH$ | >35 | >35 | >35 |
| $NH_2NH_2$ | >35 | >35 | >35 |
| hydroquinone | 14 | >35 | >35 |
| $Sn^{+2}$ | 3 | 12 | 32 |
| ascorbic acid | 1 | 3 | 9 |
| $Zn (H_2)$ | <1 | 2 | 6 |
| $Na_2SO_3$ | <1 | 2 | 5 |
| SFS | <1 | <1 | 3 |
| $Na_2S_2O_4$ | <1 | <1 | 3 |

Although treatment under high temperature conditions as compared with Example 6, resulted in higher activities for all reactants, the surprisingly more active reductants in accordance with the condition of Example 6, maintained their comparatively higher activity under the more rigorous conditions of Example 7.

EXAMPLE 8

The ability to decontaminate metal substrates bearing radioactive contaminants is shown by the following:

SAMPLE PREPARATION

Stainless steel discs, approximately one inch in diameter, were contaminated with $^{233}U$, $^{239}Pu$ or $^{241}Am$ (actinide series elements).

Each sample was prepared by 1) oxidizing the surface with hydrogen peroxide; 2) heating a disc to a dull red heat for a few seconds in air; 3) depositing tracer level concentrations of one of the three actinides, as a nitrate salt, on the surface of the disc; and 4) heating the disc again to a dull heat for 10 seconds to insure that the actinide nitrate is converted to its oxide and to insure that the activity is driven into the oxide film on the surface of the steel discs.

The sample discs were then counted radiometrically using an internal proportional alpha counter to measure the quantity of activity on each disc. These samples represent an extreme case with respect to difficulty in removing contamination.

DECONTAMINATION TESTING

The discs were introduced into solutions of 1-hydroxyethylidene-1,1-diphosphonic acid (HEDPA) and SFS as shown in the following Table. The solutions were stirred with a magnetic stirrer. After the indicated predetermined period of time, the discs were rinsed with water, dried on a hot plate and recounted in the proportional alpha counter. The discs were then leached a second, and in some cases a third time, using the same procedure. Two series of experiments were performed, one at room temperature and the other at 70-80 degrees Centigrade. The results are tabulated below:

| Contact Time | $^{233}U$ | $^{237}Pu$ | $^{241}Am$ |
|---|---|---|---|
| Leaching Solution: 1 M HEDPA/0.1 M SFS Room Temperature (about 25 degrees Centigrade) Activity on Disc (Counts/Minute) | | | |
| none | $1.7 \times 10^{+3}$ | $1.0 \times 10^{+5}$ | $1.0 \times 10^{+5}$ |
| 10 minutes | $1.2 \times 10^{+3}$ | $3.7 \times 10^{+4}$ | $3.9 \times 10^{+4}$ |
| 20 minutes | $1.1 \times 10^{+3}$ | $2.6 \times 10^{+4}$ | $3.8 \times 10^{+4}$ |
| 15 hours | $6.9 \times 10^{+2}$ | $2.6 \times 10^{+4}$ | $8.3 \times 10^{+2}$ |
| Total % removal | 90 | 74 | 99 |
| Leaching Solution: 1 M HEDPA/0.1 M SFS 70-80 degrees Centigrade Activity on Disc (Counts/Minute) | | | |
| none | $7.3 \times 10^{+3}$ | $1.2 \times 10^{+5}$ | $1.0 \times 10^{+5}$ |
| 10 minutes | $2.1 \times 10^{+2}$ | $1.0 \times 10^{+4}$ | $2.5 \times 10^{+4}$ |
| 20 minutes | 8 | $9.4 \times 10^{+3}$ | $1.8 \times 10^{+4}$ |
| Total % removal | 99.9 | 92 | 82 |

DISCUSSION

Although there is an additive effect for dissolution of metal oxides when combining various acids with reductants, a synergistic effect is shown when di- and polyphosphonic acids are used. This includes the aminophosphonic acids such as aminotris(methylenephosphonic acid). The reductants include organic reductants, such as ascorbic acid and hydroquinone and inorganic reductants. Sulfur-based reductant such as sodium sulfite, sodium dithionite and sodium formaldehyde sulfoxylate show the greatest effect. Hydrogen formed in situ shows a similar strong effect.

Acid concentrations can range up to the concentration of standard concentrated acid as manufactured, but are preferably in the 0.01-3 M range. The reductant concentrations can range up to about 5 M, but are preferably in the 0.001-0.3M range. The ratio of acid to reductant is preferably at least 0.5, more preferably at least 5 and most preferably at least 10.

The treatment temperatures can range from ambient up to the reflux temperature of the treatment solution, but preferably in the ambient to 80 degrees Centigrade range. Treatment at ambient temperature is especially preferred.

METHODS OF USE

To use the inventive composition for decontaminating hand tools or other small pieces of equipment which may have been contaminated such as by use in a nuclear power plant, it is possible simply to dip the equipment or tools into a container of a composition in accordance with the present invention. Alternatively, the composition can be sprayed onto the surface or rubbed on with a suitable applicator.

Depending on the amount of contamination and the condition of the equipment, a contact time of several minutes should be used. A contact time of 10 minutes up to about 1 hour is preferable. This can be determined by measuring the residual radiation of the tools to be sure that they are properly decontaminated. As shown in Example 8 above, even with baked-in contaminants, substantial reduction in contamination is possible after 1 hour although some samples were treated for up to 24 hours.

If it is desired to decontaminate pipes through which radioactive fluids have passed, or just to remove iron oxides from the inside of the pipes through which water or steam has passed, essentially the same principle apples. A composition in accordance with the present invention is circulated through the pipes or other equipment to be decontaminated for a sufficient time to accomplish the required results. Spraying or applying with a suitable applicator may also be used. If equipment is being decontaminated, the level of radiation can be measured to determine when the treatment is sufficient. The removal of scale or other iron oxide deposits can be determined by inspection or, in extreme cases where there is clogging, by a reduction in the back pressure on the materials being pumped through the system.

Removal of iron oxide contaminants can be done using usual equipment to leach contaminants from many types of materials. Heap leaching of soil or ore can be practiced, for example.

The treatment of radioactive sludge can also be accomplished by leaching the sludge with the inventive materials although usual precautions necessary for handling such materials must be applied. Leaching can be accomplished by heap-leaching or batch processing methods such as are usual in metal value recovery operations used in the mining industry.

The above is by way of illustration of preferred embodiments of the invention but is not considered limitative of the scope of the invention which is defined by the following claims.

What is claimed is:

1. A mixture of di- polyphosphonic acid and a reductant wherein each is present in a sufficient amount to provide a synergistic effect with respect to the dissolution of metal oxides and optionally containing corrosion inhibitors and pH adjusting agents; said reductant being sodium dithionite, or sodium formaldehyde sulfoxylate.

2. The mixture of claim 1 comprising 0.01 M–3 M of the di- or polyphosphonic acid, said mixture having a molar ratio of the di- or polyphosphonic acid to the reductant of at least 0.5.

3. The composition of claim 2, wherein said molar ratio is at least 5.

4. The composition of claim 3, wherein said molar ratio is at least 10.

5. The composition of claim 1, wherein the reductant is sodium formaldehyde sulfoxylate.

6. The composition of claim 1, wherein the acid is hydroxyethylidene diphosphonic acid and the reductant is sodium formaldehyde sulfoxylate.

7. The composition of claim 1, containing said corrosion inhibitors and/or a sufficient amount of said pH adjusting agent to raise the pH of the mixture to at least 7.

8. The composition of claim 1, wherein the di- or polyphosphonic acid is vinylidene diphosphonic acid, dihydroxyethylidene diphosphonic acid diphosphonic acid or nitrolotris(methylenephosphonic acid).

9. The composition of claim 1, wherein the di- or polyphosphonic acid is hydroxyethylidene diphosphonic acid.

10. The composition of claim 7, wherein the acid is hydroxyethylidene diphosphonic acid vinylidene diphosphonic acid, dihydroxyethylidene diphosphonic acid.

11. The composition of claim 1, wherein the reductant is sodium dithionite.

* * * * *

UNITED STATES PATENT AND TRADEMARK OFFICE
CERTIFICATE OF CORRECTION

PATENT NO. : 5,078,894

DATED : January 7, 1992

INVENTOR(S) : HORWITZ et al

It is certified that error appears in the above-identified patent and that said Letters Patent is hereby corrected as shown below:

Column 1, replace lines 5 and 6 with the following:

--

The U.S. Government has rights in this invention pursuant to Contract No.W-31-109-ENG-38 between the U.S. Department of Energy and University of Chicago as operator of Argonne National Laboratory.--

Signed and Sealed this

Sixteenth Day of November, 1993

*Attest:*

BRUCE LEHMAN

*Attesting Officer*     *Commissioner of Patents and Trademarks*